(12) United States Patent
VanTongeren

(10) Patent No.: US 12,383,110 B2
(45) Date of Patent: Aug. 12, 2025

(54) DISPLAYING A DYNAMICALLY CHANGING WET CLEAN PATH OF AN AUTONOMOUS FLOOR CLEANER

(71) Applicant: BISSELL Inc., Grand Rapids, MI (US)

(72) Inventor: Todd R. VanTongeren, Ada, MI (US)

(73) Assignee: BISSELL Inc., Grand Rapids, MI (US)

( * ) Notice: Subject to any disclaimer, the term of this patent is extended or adjusted under 35 U.S.C. 154(b) by 261 days.

(21) Appl. No.: 18/098,758

(22) Filed: Jan. 19, 2023

(65) Prior Publication Data

US 2023/0240499 A1    Aug. 3, 2023

Related U.S. Application Data

(60) Provisional application No. 63/305,816, filed on Feb. 2, 2022.

(51) Int. Cl.

| | |
|---|---|
| A47L 11/00 | (2006.01) |
| A47L 11/28 | (2006.01) |
| A47L 11/40 | (2006.01) |
| G05D 1/00 | (2024.01) |
| G06F 3/00 | (2006.01) |
| G06F 3/04842 | (2022.01) |

(52) U.S. Cl.
CPC .......... *A47L 11/4011* (2013.01); *A47L 11/28* (2013.01); *G05D 1/0044* (2013.01); *A47L 2201/04* (2013.01); *A47L 2201/06* (2013.01); *G06F 3/04842* (2013.01)

(58) Field of Classification Search
CPC .. A47L 11/4011; A47L 11/28; A47L 2201/04; A47L 2201/06; G05D 1/0044; G06F 3/04842
See application file for complete search history.

(56) References Cited

U.S. PATENT DOCUMENTS

| | | | |
|---|---|---|---|
| 11,499,325 B2* | 11/2022 | Telleria | ................. B25J 9/1661 |
| 2016/0370802 A1* | 12/2016 | Ueda | .................... G05D 1/0214 |
| 2020/0047343 A1* | 2/2020 | Bal | ........................ B25J 9/1689 |

* cited by examiner

*Primary Examiner* — Wade Miles
*Assistant Examiner* — Aaron G Cain
(74) *Attorney, Agent, or Firm* — Warner Norcross + Judd LLP

(57) ABSTRACT

Display of a wet cleaning routine of an autonomous floor cleaning robot is provided. Estimated wetness of areas of the floor can be tracked and displayed to the user so they can avoid walking on those areas of the floor until sufficiently dried. The areas of the map that that are still wet from cleaning can be displayed and transition to a different type of indicia over time as the floor dries. The wet floor status can be tracked with a timer by comparing elapsed time since the autonomous floor cleaner traversed the subject region and dispensed cleaning solution with an estimated drying time for cleaning solution on the floor. The estimated drying time can be based upon the flow rate of the autonomous floor cleaner.

19 Claims, 10 Drawing Sheets

DISPLAYING A DYNAMICALLY CHANGING WET CLEAN PATH OF AN AUTONOMOUS FLOOR CLEANER

BACKGROUND OF THE INVENTION

The present invention relates to a method and apparatus for displaying a dynamically changing wet clean path of an autonomous floor cleaner.

Autonomous or robotic floor cleaners can move without the assistance of a user or operator to clean a floor surface. For example, the floor cleaner can be configured to sweep dirt (including dust, hair, and other debris) into a collection bin carried on the floor cleaner or to sweep dirt using a cloth which collects the dirt. The floor cleaner can move randomly about a surface while cleaning the floor surface or use a mapping/navigation system for guided navigation about the surface. Some floor cleaners are further configured to apply and extract liquid for deep cleaning carpets, rugs, and other floor surfaces.

Autonomous floor cleaners may be connected to a mobile device to display information about a cleaning run. Some known systems can display a floorplan and note how much of the area has been covered by the autonomous floor cleaner by coloring the floor plan as the autonomous floor cleaner traverses the area.

SUMMARY OF THE INVENTION

The present disclosure provides a system and method for display of wet floor areas on a floor cleaning map. The wet floor areas can be viewed during a live map view in a floor cleaning robot control application on a separate device. The live view can display wetness estimations for areas of the floor providing an indication to a user of where to avoid walking. Indications regarding the wet areas can be displayed in a variety of different ways (e.g., colors, patterns, or outlines). The wetness estimations can be calculated based on a timer calibrated to the flow rate of the autonomous floor cleaner. In some aspects, the view of the floor cleaning map can be altered over time to represent the degree of wetness or dryness of a particular area, which can change over time. The degree of wetness can be determined based upon the flow rate of cleaning solution dispensed by the autonomous floor cleaner. The speed of the change in the view can be proportional to the mode in which the autonomous floor cleaner is set. The ability to visualize the wet areas of the floor cleaning map can provide the user an update as to the floor status and can act as a reminder that the autonomous floor cleaner is performing wet cleaning. Further, the wet areas can provide an up-to-the moment live view of the wet floor areas.

The present disclosure provides one aspect of a mobile device associated with an autonomous floor cleaner that is configurable in a wet clean mode. The mobile device includes a display screen, a memory configured to store a representation of a wet clean path of the autonomous floor cleaner, and a communication module configured to receive robot position information indicative of the wet clean path of the autonomous floor cleaner. The mobile device also includes a control system configured to display, on the display screen, a representation of a wet clean path of the autonomous floor cleaner that dynamically changes over time based upon expected drying time of the wet clean path. The memory can be configured to store a map of a cleaning region, e.g., a floor plan, and the control system can be configured to display, on the display screen, the map of the cleaning region and the wet clean path of the autonomous floor cleaner relative to the map of the cleaning region. The wet clean path can include indicia indicative of a dynamic amount of wetness along the wet clean path. Further, the wet clean path can dynamically change over time from a first indicia to a second indicia based upon expected drying time of the wet clean path. The expected drying time of the wet clean path can change based on at least one or more of a flow rate of the autonomous floor cleaner, a floor type of a cleaning area, a solution type of a cleaning solution output by the autonomous floor cleaner, and a cleaning agitator orientation of the autonomous floor cleaner.

The present disclosure provides another aspect in connection with a mobile device that can be associated with an autonomous floor cleaner that is configurable in a wet clean mode. The mobile device can include a controller, memory, a display screen and a communication module. The memory can store current and previous positions of the autonomous floor cleaner relative to a map. The positions can be associated with timestamps. The display screen can display the map and indicate floor clean statuses of various regions of the map. The current position of the autonomous floor cleaner as well as previous positions (e.g., a wet cleaning path) of the autonomous floor cleaner can be indicated on the map. The position of the autonomous floor cleaner and floor clean statuses of the various map regions can be updated by the controller. The updates can be done as the autonomous floor cleaner traverses a cleaning path to provide a live view (i.e., a real-time or near real-time view) to the mobile device display. The controller can determine and store in memory a floor clean status for a region of the map associated with previous positions of the autonomous floor cleaner to track whether the region presents a dry, wet, or uncleaned portion of the floor. The controller can determine and store in memory floor drying times to track the degree of wetness (or dryness) associated with various regions of the map associated with previous positions of the autonomous floor cleaner. Based on a comparison between the timestamps of the autonomous floor cleaner and the drying times, the floor clean status of the various regions of the map can be updated to display dry, wet, and uncleaned portions of the floor.

These and other objects, advantages, and features of the invention will be more fully understood and appreciated by reference to the description of the current aspect and the drawings.

Before the aspects of the invention are explained in detail, it is to be understood that the invention is not limited to the details of operation or to the details of construction and the arrangement of the components set forth in the following description or illustrated in the drawings. The invention may be implemented in various other aspects and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various aspects. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components. Any reference to claim elements as "at least one of X, Y and Z" is meant to include any one of X, Y or Z individually, and any combination of X, Y and Z, for example, X, Y, Z; X, Y; X, Z; and Y, Z.

DESCRIPTION OF THE CURRENT ASPECTS

A method and apparatus for displaying a dynamically changing wet clean path of an autonomous floor cleaner is provided.

I. System for Displaying a Dynamically Changing Wet Clean Path

Figure 1:
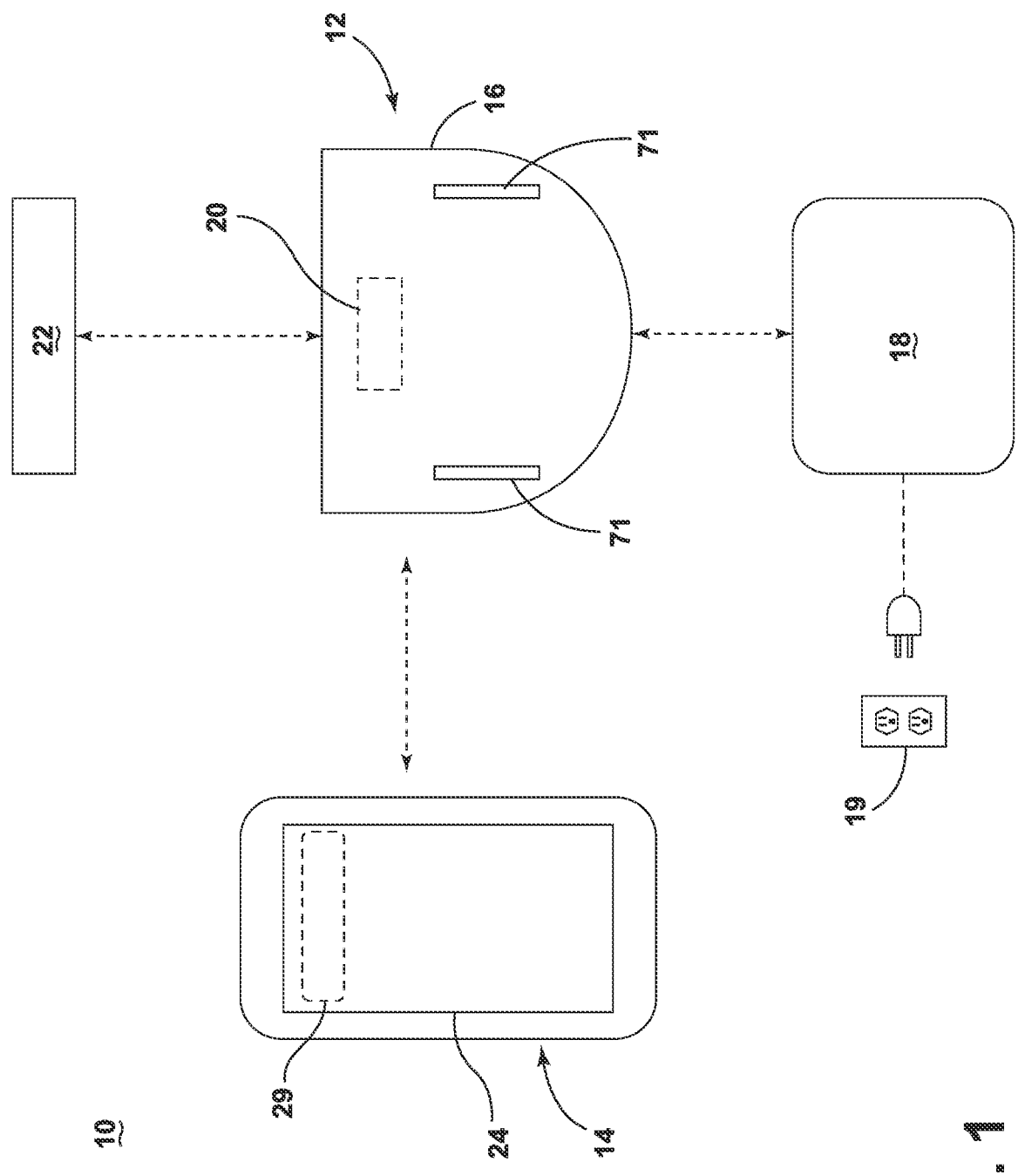
FIG. 1 is an automated floor cleaning system according to one aspect.

FIG. 1 is a schematic view of a system 10 for displaying a dynamically changing wet clean path of an autonomous floor cleaner according to one aspect. The system 10 includes an autonomous floor cleaner or cleaning robot 12 and a mobile device 14. In one aspect, the mobile device 14 may be a smartphone, a tablet, a wearable computer such as a smartwatch, or a dedicated remote display device. As used herein, the term smartphone includes a mobile phone that performs many of the functions of a computer, typically having a touchscreen interface, Internet access, and an operating system capable of running downloaded applications.

In one aspect, the autonomous floor cleaner 12 may wirelessly connect to the mobile device 14. The autonomous floor cleaner can wirelessly connect to the mobile device 14 directly or through an external server. In one aspect, the external server may be one or more cloud computing servers.

The autonomous floor cleaner 12 can mount the components of various functional systems of the robot in an autonomously moveable unit or housing 16. In one aspect, the autonomous floor cleaner 12 can be a mopping robot, and may include a reservoir in the housing 16 to house a cleaning fluid, which may be directed at a surface to be cleaned. In one aspect, the autonomous floor cleaner 12 can be a dry vacuuming robot, and may include at least a vacuum collection system for creating a partial vacuum to suck up debris (which may include dirt, dust, soil, hair, and other debris) from a surface to be cleaned, such as a floor surface, and collecting the removed debris in a space provided on the autonomous floor cleaner 12 for later disposal. In another embodiment, the autonomous floor cleaner 12 can be a deep cleaning robot, and includes at least a fluid supply system for storing cleaning fluid and delivering the cleaning fluid to the surface to be cleaned, a fluid recovery system for removing the cleaning fluid and debris from the surface to be cleaned and storing the recovered cleaning fluid and debris. Other functional systems for the cleaning robot 12 are also possible, such as an apparatus configured to deliver steam.

The system 10 may also include a docking station 18 for the autonomous floor cleaner 12. The docking station 18 can be configured to recharge the autonomous floor cleaner 12. The docking station 18 can be connected to a household power supply, such as a wall outlet 19, and can include a converter for converting the AC voltage into DC voltage for recharging a power supply onboard the autonomous floor cleaner 12. The docking station 18 can also include various sensors and emitters for monitoring robot status, enabling auto-docking functionality, communicating with each robot, as well as features for network and/or BLUETOOTH® connectivity. The docking station 18 may have other functionality as well; in the case of a deep cleaning robot, the docking station 18 can be configured to automatically refill a solution tank of the autonomous floor cleaner 12 with fresh water and empty a recovery tank of the autonomous floor cleaner 12. Optionally, the system 10 can include an artificial barrier 22 for containing the autonomous floor cleaner 12 within a user-determined boundary. In one aspect, the artificial barrier 22 may be input by the user through the mobile device 14. In an alternate aspect, the artificial barrier 22 can be a physical component placed in a cleaning area.

In the aspect illustrated, the mobile device 14 includes a display screen 24. In one aspect, the display screen 24 is a touchscreen interface. The display screen 24 can be a capacitive touchscreen, a resistive touchscreen, or comprise other suitable touchscreen technology capable of sensing touch. The mobile device 14 can have a processor or central processing unit (CPU) 29.

In one aspect of the system 10, the mobile device 14 can execute an application for displaying a wet clean path of the autonomous floor cleaner 12. The application can be a downloaded application from a server. The mobile device 14 can wirelessly communicate with the autonomous floor cleaner 12 using any suitable wireless technology, such as BLUETOOTH® or Wi-Fi™.

In alternative embodiments, instead of or in addition to displaying the wet clean path of the autonomous floor cleaner on a mobile device, the wet clean path can be displayed on a screen of the autonomous floor cleaner itself or be projected onto a nearby surface by projection equipment installed on the autonomous floor cleaner. In yet another embodiment, instead of or in addition to displaying the wet clean path elsewhere, the wet clean path can be displayed on a display screen of a multi-functional docking station that works in conjunction with the autonomous floor cleaner. The dock may be paired with and communicate with the autonomous floor cleaner.

Figure 2:
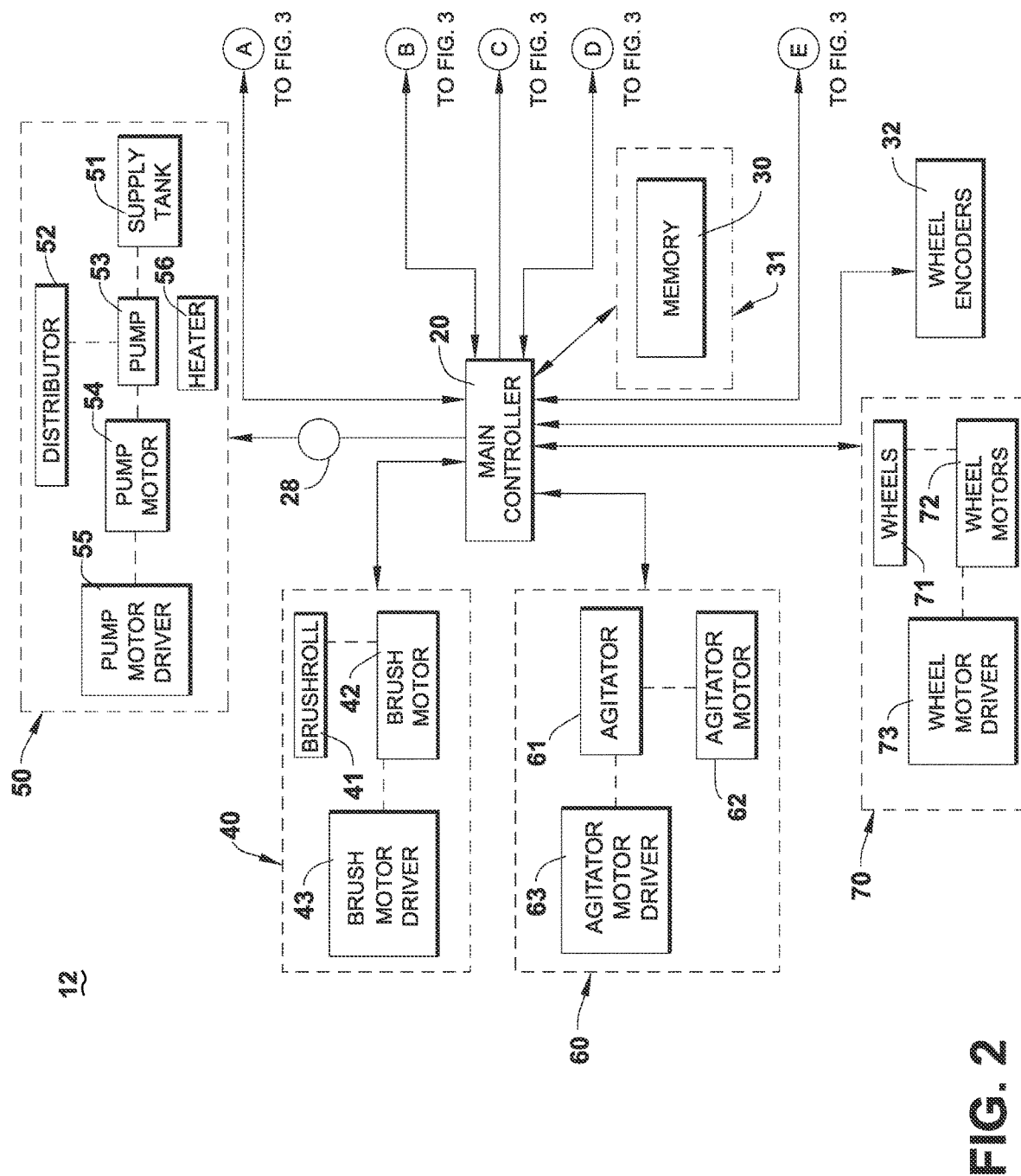
FIG. 2 is a schematic view of an exemplary autonomous floor cleaner illustrating functional systems according to one aspect.
Figure 3:
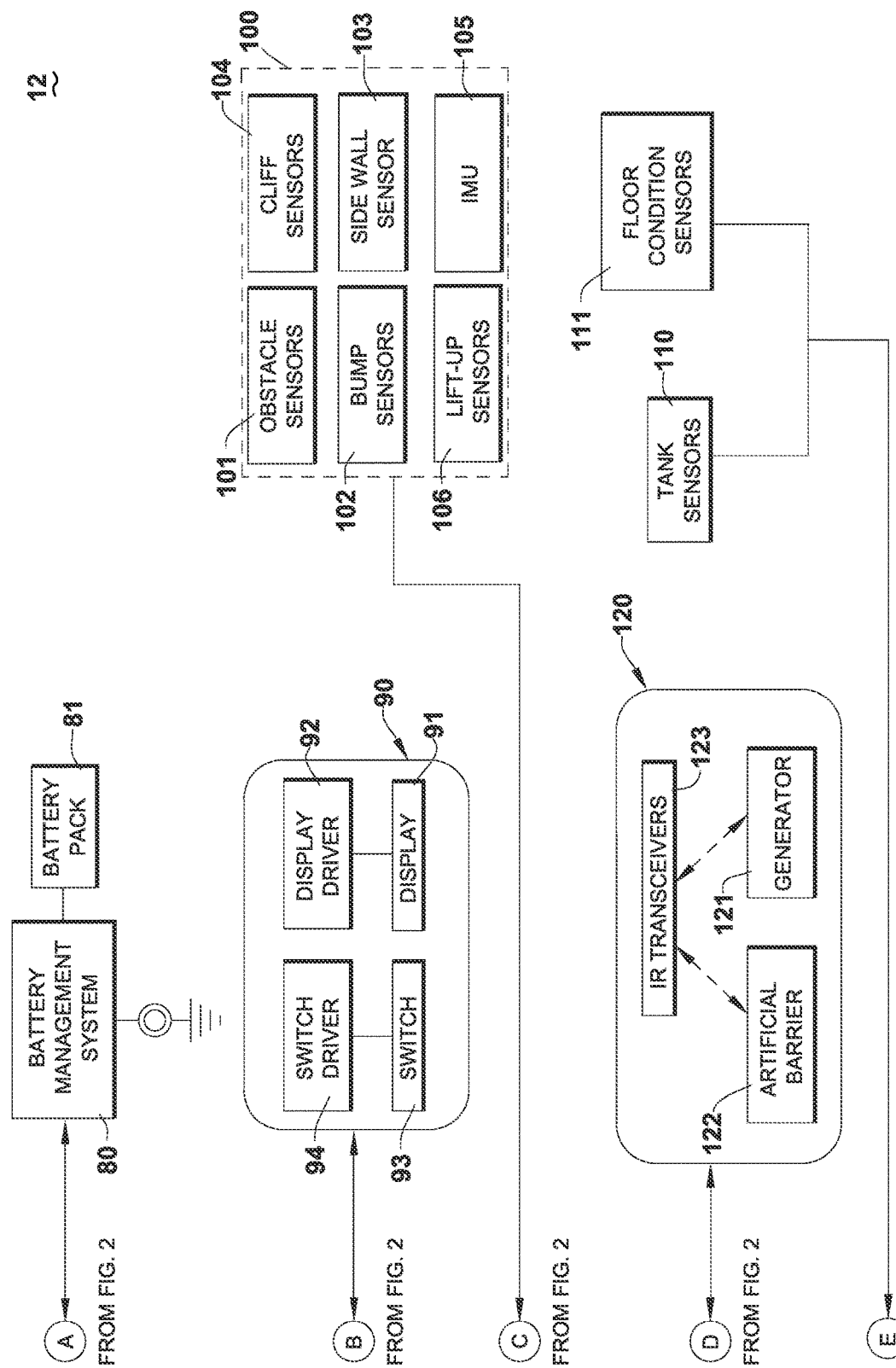
FIG. 3 is a schematic view of the autonomous floor cleaner of FIG. 2 illustrating additional functional systems according to one aspect.

FIGS. 2 and 3 illustrate a schematic view of an autonomous floor cleaner 12 according to one aspect. It is noted that the autonomous floor cleaner 12 shown is but one example of a floor cleaning robot configured to sweep as well as dust, mop, or otherwise conduct a wet cleaning cycle of operation, and that other autonomous cleaners requiring fluid supply or fluid recovery are contemplated, including, but not limited to autonomous floor cleaners capable of delivering liquid, steam, mist, or vapor to the surface to be cleaned.

The autonomous floor cleaner 12 can include components of various functional systems in an autonomously moveable unit. The autonomous floor cleaner 12 can include a housing 16 (FIG. 1) adapted to selectively mount components of the systems to form a unitary movable device. A controller 20 may be operably coupled with the various functional systems of the autonomous floor cleaner 12 for controlling the operation of the autonomous floor cleaner 12. The controller 20 can be a microcontroller unit (MCU) that contains at least one central processing unit (CPU).

A navigation/mapping system 30 can be provided in the autonomous floor cleaner 12 for guiding the movement of the autonomous floor cleaner 12 over the surface to be cleaned, generating and storing maps of the surface to be cleaned, and recording status or other environmental variable information. The controller 20 can receive input from the navigation/mapping system 30 or from a mobile device such as a smartphone (not shown) for directing the autonomous floor cleaner 12 over the surface to be cleaned. The navigation/mapping system 30 can include a memory 31 that can store any data useful for navigation, mapping or conducting a cycle of operation, including, but not limited to, maps for navigation, inputs from various sensors that are used to guide the movement of the autonomous floor cleaner 12, etc. For example, wheel encoders 32 can be placed on the drive shafts of wheels coupled to the autonomous floor cleaner 12 and configured to measure a distance traveled by the autonomous floor cleaner 12. The distance measurement can be provided as input to the controller 20.

In an autonomous mode of operation, the autonomous floor cleaner 12 can be configured to travel in any pattern useful for cleaning or sanitizing including boustrophedon or alternating rows (that is, the autonomous floor cleaner 12 travels from right-to-left and left-to-right on alternate rows), spiral trajectories, etc., while cleaning the floor surface, using input from various sensors to change direction or adjust its course as needed to avoid obstacles. In a manual mode of operation, movement of the autonomous floor cleaner 12 can be controlled using a mobile device such as a smartphone or tablet.

The autonomous floor cleaner 12 can also include at least a fluid delivery system 50 for storing cleaning fluid and delivering the cleaning fluid to the surface to be cleaned, a debris removal assembly 60 for removing moistened dust and other debris and/or liquid from the surface to be cleaned, and a drive system 70 for autonomously moving the autonomous floor cleaner 12 over the surface to be cleaned. The autonomous floor cleaner 12 may optionally include the components of a sweeper 40 for removing debris particles from the surface to be cleaned, The sweeper 40 can also include at least one agitator for agitating the surface to be cleaned. The agitator can be in the form of a brushroll 41 mounted for rotation about a substantially horizontal axis, relative to the surface over which the autonomous floor cleaner 12 moves. A drive assembly including a separate, dedicated brush motor 42 can be provided within the autonomous floor cleaner 12 to drive the brushroll 41. Other agitators or brushrolls can also be provided, including one or more stationary or non-moving brushes, or one or more brushes that rotate about a substantially vertical axis. In addition, a debris receptacle (not shown) such as a dustbin can be provided to collect dirt or debris from the brushroll 41.

The fluid delivery system 50 can include a supply tank 51 for storing a supply of cleaning fluid and at least one fluid distributor 52 in fluid communication with the supply tank 51 for depositing a cleaning fluid onto the surface. The cleaning fluid can be a liquid such as water or a cleaning solution specifically formulated for hard or soft surface cleaning. The fluid distributor 52 can be one or more spray nozzles provided on the housing 16 with an orifice of sufficient size such that debris does not readily clog the nozzle. Alternatively, the fluid distributor 52 can be a manifold having multiple distributor outlets.

A pump 53 can be provided in the fluid pathway between the supply tank 51 and the at least one fluid distributor 52 to control the flow of fluid to the at least one fluid distributor 52. The pump 53 can be driven by a pump motor 54 to move liquid at any flowrate useful for a cleaning cycle of operation.

Various combinations of optional components can also be incorporated into the fluid delivery system 50, such as a heater 56 or one or more fluid control and mixing valves. The heater 56 can be configured, for example, to warm up the cleaning fluid before it is applied to the surface. In one aspect, the heater 56 can be an in-line fluid heater between the supply tank 51 and the distributor 52. In another example, the heater 56 can be a steam generating assembly. The steam assembly may be in fluid communication with the supply tank 51 such that some or all of the liquid applied to the floor surface is heated to vapor.

The debris removal assembly 60 can be utilized to disperse the distributed fluid on the floor surface and remove moistened dust and other debris. In one aspect, the debris removal assembly 60 may be used for sweeping. In another aspect, the debris removal assembly 60 may be used for mopping. The debris removal 60 can include at least one agitator 61 that can optionally be rotatable. For example, the at least one agitator 61 can be driven to rotate about a vertical axis that intersects with the center of the respective agitator 61. In one aspect, the at least one agitator 61 may be a pad, a brushroll, or any other suitable mopping or sweeping element. A drive assembly including at least one agitator motor 62 can be provided as part of the dusting assembly 60. Each agitator 61 can be optionally detachable for purposes of cleaning and maintenance.

The drive system 70 can include drive wheels 71 for driving the autonomous floor cleaner 12 across a surface to be cleaned. The drive wheels can be operated by a common wheel motor 72 or individual wheel motors coupled with the drive wheels by a transmission, which may include a gear train assembly or another suitable transmission. The drive system 70 can receive inputs from the controller 20 for driving the autonomous floor cleaner 12 across a floor, based on inputs from the navigation/mapping system 30 for the autonomous mode of operation or based on inputs from a mobile device for the manual mode of operation. The drive wheels 71 can be driven in a forward or reverse direction to move the unit forwardly or rearwardly. Furthermore, the drive wheels 71 can be operated simultaneously at the same rotational speed for linear motion or independently at different rotational speeds to turn the autonomous floor cleaner 12 in a desired direction.

The autonomous floor cleaner 12 can include any number of motors useful for performing locomotion and cleaning. In one example, five dedicated motors can be provided to rotate each of two agitators 61, the brushroll 41, and each of two drive wheels 71. In another example, one shared motor can rotate both the agitators 61, a second motor can rotate the brushroll 41, and a third and fourth motor can rotate each drive wheel 71. In still another example, one shared motor can rotate the agitators 61 and the brushroll 41, and a second and third motor can rotate each drive wheel 71.

In addition, a brush motor driver 43, pump motor driver 55, agitator motor driver 63, and wheel motor driver 73 can be provided for controlling the brush motor 42, pump motor 54, agitator motors 62, and wheel motors 72, respectively. The motor drivers 43, 55, 63, 73 can act as an interface between the controller 20 and their respective motors 42, 54, 62, 72. The motor drivers 43, 55, 63, 73 can also be an integrated circuit chip (IC). It is also contemplated that a single wheel motor driver 73 can control multiple wheel motors 72 simultaneously.

Turning to FIG. 3, the motor drivers 43, 55, 63, 73 (FIG. 2) can be electrically coupled to a battery management system 80 that includes a built-in rechargeable battery or removable battery pack 81. In one example, the battery pack 81 can include lithium ion batteries. Charging contacts for the battery pack 81 can be provided on an exterior surface of the autonomous floor cleaner 12. The docking station 18 can be provided with corresponding charging contacts that can mate to the charging contacts on the exterior surface of the autonomous floor cleaner 12. The battery pack 81 can be selectively removable from the autonomous floor cleaner 12 such that it can be plugged into mains voltage via a DC transformer for replenishment of electrical power, i.e., charging. When inserted into the autonomous floor cleaner 12, the removable battery pack 81 can be at least partially located outside the housing 16 or completely enclosed in a compartment within the housing 16, in non-limiting examples and depending upon the implementation.

The controller 20 may be further operably coupled with a user interface (UI) 90 on the autonomous floor cleaner 12 for receiving inputs from a user. The user interface 90 can be used to select an operation cycle for the autonomous floor cleaner 12 or otherwise control the operation of the autonomous floor cleaner 12. The user interface 90 can have a display 91, such as an LED display, for providing visual notifications to the user. A display driver 92 can be provided for controlling the display 91, and acts as an interface between the controller 20 and the display 91. The display driver 92 may be an integrated circuit chip (IC). The autonomous floor cleaner 12 can further be provided with a speaker (not shown) for providing audible notifications to the user. The autonomous floor cleaner 12 can further be provided with one or more cameras or stereo cameras for acquiring visible notifications from the user. In this way, the user can communicate instructions to the autonomous floor cleaner 12 by gestures. For example, the user can wave their hand in front of the camera to instruct the autonomous floor cleaner 12 to stop or move away. The user interface 90 can further have one or more switches 93 that are actuated by the user to provide input to the controller 20 to control the operation of various components of the autonomous floor cleaner 12. A switch driver 94 can be provided for controlling the switch 93, and acts as an interface between the controller 20 and the switch 93.

The controller 20 can further be operably coupled with various sensors for receiving input about the environment and can use the sensor input to control the operation of the autonomous floor cleaner 12. The sensors can detect features of the surrounding environment of the autonomous floor cleaner 12 including, but not limited to, walls, floors, chair legs, table legs, footstools, pets, consumers, and other obstacles. The sensor input can further be stored in a memory or used to develop maps for navigation. Some exemplary sensors are illustrated in FIG. 3, and described below. Although it is understood that not all sensors shown may be provided, additional sensors may be provided, and that all of the possible sensors can be provided in any combination.

The autonomous floor cleaner 12 can include a positioning or localization system 100. The localization system 100 can include one or more sensors, including but not limited to the sensors described above. In one non-limiting example, the localization system 100 can include obstacle sensors 101 determining the position of the autonomous floor cleaner 12, such as a stereo camera in a non-limiting example, for distance and position sensing. The obstacle sensors 101 can be mounted to the housing 16 of the autonomous floor cleaner 12, such as in the front of the housing 16 to determine the distance to obstacles in front of the autonomous floor cleaner 12. Input from the obstacle sensors 101 can be used to slow down or adjust the course of the autonomous floor cleaner 12 when objects are detected.

The autonomous floor cleaner can include sensors capable of providing sufficient sensor input to build a 3D map of the autonomous floor cleaner's environment, such as stereo cameras. The colorations used in connection with generating the 2D map from the stereo cameras or other sensors may also be communicated to a mobile device application and utilized to create an augmented reality experience. For example, based on the colorations and other stereo camera data, an application can be configured to provide a live, augmented reality view of an autonomous robot environment where the uncleaned, cleaned, and estimated wet areas are highlighted or otherwise displayed.

Bump sensors 102 can also be provided in the localization system 100 for determining front or side impacts to the autonomous floor cleaner 12. The bump sensors 102 may be integrated with the housing 16, such as with a bumper. Output signals from the bump sensors 102 provide inputs to the controller 20 for selecting an obstacle avoidance algorithm.

The localization system 100 can further include a side wall sensor 103 (also known as a wall following sensor) and a cliff sensor 104. The side wall sensor 103 or cliff sensor 104 can be optical, mechanical, or ultrasonic sensors, including reflective or time-of-flight sensors. The side wall sensor 103 can be located near the side of the housing 16 and can include a side-facing optical position sensor that provides distance feedback and controls the autonomous floor cleaner 12 so that autonomous floor cleaner 12 can follow near a wall without contacting the wall. The cliff sensors 104 can be bottom-facing optical position sensors that provide distance feedback and control the autonomous floor cleaner 12 so that the autonomous floor cleaner 12 can avoid excessive drops such as stairwells or ledges.

The localization system 100 can also include an inertial measurement unit (IMU) 105 to measure and report the robot's acceleration, angular rate, or magnetic field surrounding the autonomous floor cleaner 12, using a combination of at least one accelerometer, gyroscope, and, optionally, magnetometer or compass. The IMU 105 can be an integrated inertial sensor located on the controller 20 and can be a nine-axis gyroscope or accelerometer to sense linear, rotational, or magnetic field acceleration. The IMU 105 can use acceleration input data to calculate and communicate change in velocity and pose to the controller for navigating the autonomous floor cleaner 12 around the surface to be cleaned.

The localization system 100 can further include one or more lift-up sensors 106 which detect when the autonomous floor cleaner 12 is lifted off the surface to be cleaned e.g., if a user picks up the autonomous floor cleaner 12. This information is provided as an input to the controller 20, which can halt operation of the pump motor 54, brush motor 42, agitator motor 62, or wheel motors 73 in response to a detected lift-up event. The lift-up sensors 106 may also detect when the autonomous floor cleaner 12 is in contact with the surface to be cleaned, such as when the user places the autonomous floor cleaner 12 back on the ground. Upon such input, the controller 20 may resume operation of the pump motor 54, brush motor 42, agitator motor 62, or wheel motors 73.

The autonomous floor cleaner 12 can optionally include one or more tank sensors 110 for detecting a characteristic or status of the supply tank 51 or the debris receptacle (not shown). In one example, one or more pressure sensors for detecting the weight of the supply tank 51 or the debris receptacle can be provided. In another example, one or more magnetic sensors for detecting the presence of the supply tank 51 or debris receptacle can be provided. This information is provided as an input to the controller 20, which may prevent operation of the autonomous floor cleaner 12 until the supply tank 51 is filled, the debris receptacle is emptied, or both are properly installed, in non-limiting examples. The controller 20 may also direct the display 91 to provide a notification to the user that either or both of the supply tank 51 and debris receptacle is missing.

The autonomous floor cleaner 12 can further include one or more floor condition sensors 111 for detecting a condition of the surface to be cleaned. For example, the autonomous floor cleaner 12 can be provided with an IR dirt sensor, a stain sensor, an odor sensor, or a wet mess sensor. The floor condition sensors 111 provide input to the controller that may direct operation of the autonomous floor cleaner 12 based on the condition of the surface to be cleaned, such as by selecting or modifying a cleaning cycle. Optionally, the floor condition sensors 111 can also provide input for display on a mobile device.

Optionally, an artificial barrier system 120 can be provided for containing the autonomous floor cleaner 12 within a user-determined boundary. The artificial barrier system 120 can include an artificial barrier generator 121 that comprises a barrier housing with at least one signal receiver for receiving a signal from the autonomous floor cleaner 12 and at least one IR transmitter for emitting an encoded IR beam towards a predetermined direction for a predetermined period of time. The artificial barrier generator 121 can be battery-powered by rechargeable or non-rechargeable batteries or directly plugged in to mains power. In one non-limiting example, the receiver can comprise a microphone configured to sense a predetermined threshold sound level, which corresponds with the sound level emitted by the autonomous floor cleaner 12 when it is within a predetermined distance away from the artificial barrier generator. Optionally, the artificial barrier generator 121 can further comprise a plurality of IR emitters near the base of the barrier housing configured to emit a plurality of short field IR beams around the base of the barrier housing. The artificial barrier generator 121 can be configured to selectively emit one or more IR beams for a predetermined period of time, but only after the microphone senses the threshold sound level, which indicates the autonomous floor cleaner 12 is nearby. Thus, the artificial barrier generator 121 can conserve power by emitting IR beams only when the autonomous floor cleaner 12 is near the artificial barrier generator 121.

The autonomous floor cleaner 12 can have a plurality of IR transceivers (also referred to as IR XCVRs) 123 around the perimeter of the autonomous floor cleaner 12 to sense the IR signals emitted from the artificial barrier generator 121 and output corresponding signals to the controller 20, which can adjust drive wheel control parameters to adjust the position of the autonomous floor cleaner 12 to avoid boundaries established by the artificial barrier encoded IR beam and the short field IR beams. Based on the received IR signals, the controller 20 prevents the autonomous floor cleaner 12 from crossing an artificial barrier 122 or colliding with the barrier housing. The IR transceivers 123 can also be used to guide the autonomous floor cleaner 12 toward the docking station 18, if provided.

In operation, sound (or light) emitted from the autonomous floor cleaner 12 greater than a predetermined threshold signal level is sensed by the microphone (or photodetector) and triggers the artificial barrier generator 121 to emit one or more encoded IR beams for a predetermined period of time. The IR transceivers 123 on the autonomous floor cleaner 12 may sense the IR beams and output signals to the controller 20, which then manipulates the drive system 70 to adjust the position of the robot 10 to avoid one or more artificial barriers 122 established by the artificial barrier system 120 while continuing to perform a cleaning operation on the surface to be cleaned.

In one aspect, the artificial barrier system 120 may utilize virtual barriers input by a user on the mobile device 14. That is, instead of placing physical artificial barriers 122 about a room, the user can be presented on a user interface with the ability to indicate a virtual barrier, such as a keep-in zone, keep-out zone, or another virtual barrier. The autonomous floor cleaner 12 can be configured to respect the virtual barrier. For example, the autonomous floor cleaner 12 can be programmed to avoid crossing a keep-out zone or virtual barrier. As another example, the autonomous floor cleaner 12 may be programmed to efficiently travel to and from a docking station and one or more keep-in zones. Further the autonomous floor cleaner 12 may be programmed to only operate within a certain mode, such as a particular cleaning mode, depending upon the virtual barriers (for example, while within a particular keep-in zone). The virtual barriers can be respected by the autonomous floor cleaner 12 by tracking the position of the autonomous floor cleaner 12 relative to a map of the surrounding area, which includes the one or more virtual barriers indicated by the user. Put another way, the autonomous floor cleaner 12 can be configured to localize and recognize its position within an environment map. That position within the environment map can be translated and compared against the position of the virtual barrier identified via the user interface in order to map the virtual barriers to the environment map of the autonomous floor cleaner, which can then be respected according to the virtual barrier response configuration (e.g., keep-out, keep-in, etc.).

The autonomous floor cleaner 12 can operate in one of a number of modes. For example, the modes can include one or more of a wet mode, a dry mode, and a sanitization mode. During a wet mode of operation, liquid from the supply tank 51 is applied to the floor surface and both the brushroll 41 and the agitator 61 are rotated. During a dry mode of operation, the brushroll 41, the agitator 61, or a combination thereof, are rotated and no liquid is applied to the floor surface. During a sanitizing mode of operation, liquid from the supply tank 51 is applied to the floor surface and both the brushroll 41 and the agitator 61 are rotated and the autonomous floor cleaner 12 can select a travel pattern such that the applied liquid remains on the surface of the floor for a predetermined length of time. The predetermined length of time can be any duration that will result in sanitizing floor surfaces including, but not limited to, two to five minutes. However, sanitizing can be effected with durations of less than two minutes and as low as fifteen seconds.

It is also contemplated that the pump 53 (FIG. 2) can be driven according to a pulse-width modulation (PWM) signal 28. Pulse-width modulation is a method of communication by generating a pulsing signal. Pulse-width modulation can be utilized for controlling the amplitude of digital signals in order to control devices and applications, such as the pump motor 54. The PWM signal 28 can control an amount of power given to the pump 53 by cycling the on-and-off phases of a digital signal at a predetermined frequency and by varying the width of an "on" phase. The width of the "on" phase is also known as duty cycle, which can be expressed as the percentage of being "fully on" (100%). The pump 53 can essentially receive a steady power input with an average voltage value which is the result of the duty cycle and can be less than the maximum voltage capable of being delivered from the battery pack 81. The PWM signal 28 can be transmitted from the controller 20 and configured to provide a set flowrate of deposited cleaning fluid. In one non-limiting example of operation, the PWM signal 28 can cyclically energize the pump 53 for a first predetermined time duration, such as 40 milliseconds, and then de-energize the pump for a second predetermined time duration, such as 2 seconds, at a rate of 50 Hz and a duty cycle of 40%. Higher flow rates can be achieved by, for example, increasing either or both of the duty cycle or frequency. In this manner, the controller 20 can provide essentially any suitable or customized flow rate, including a low flow rate, from the pump 53 being powered from the battery pack 81.

Figure 4:
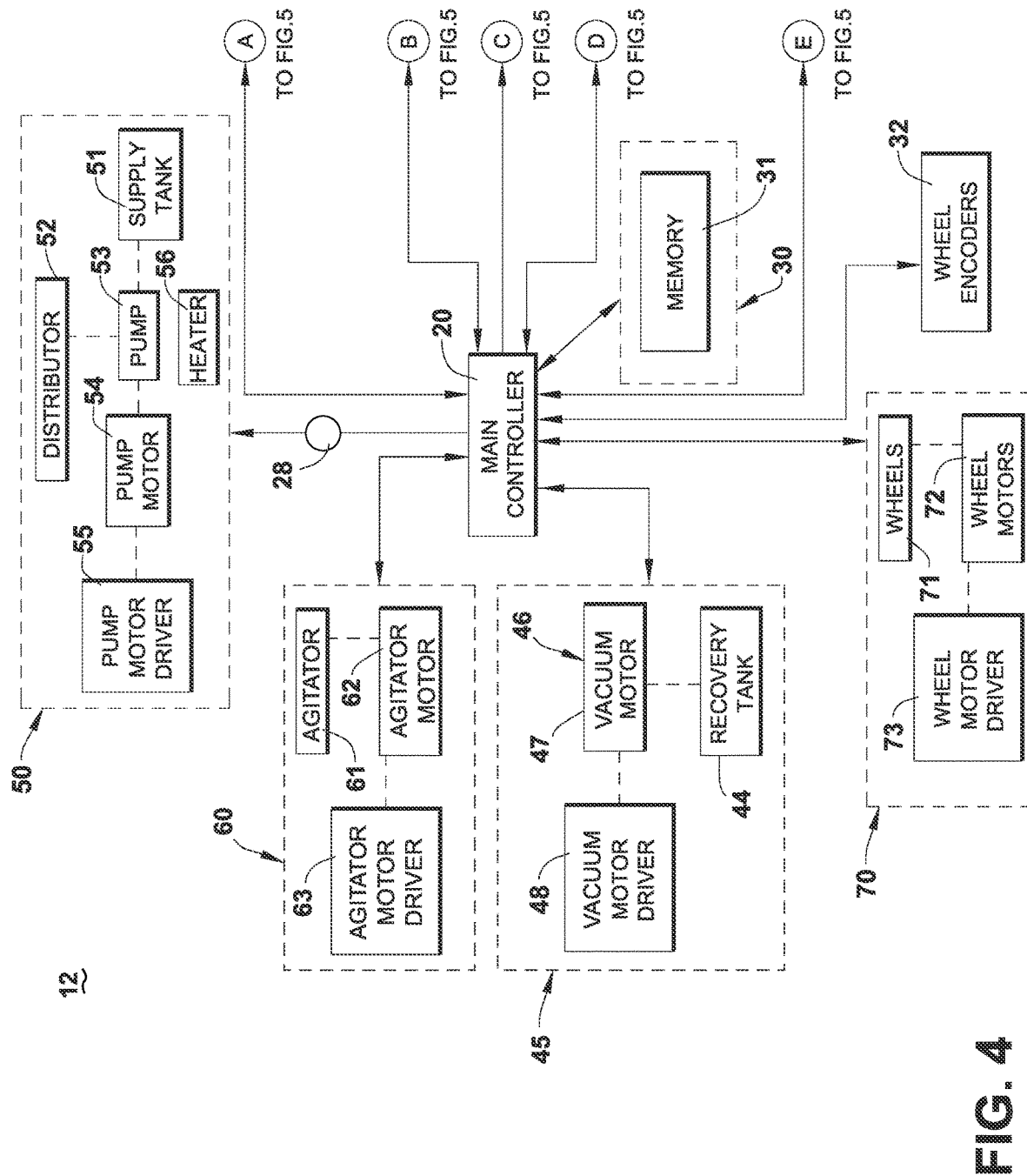
FIG. 4 is a schematic view of an exemplary autonomous floor cleaner illustrating functional systems according to one aspect.
Figure 5:
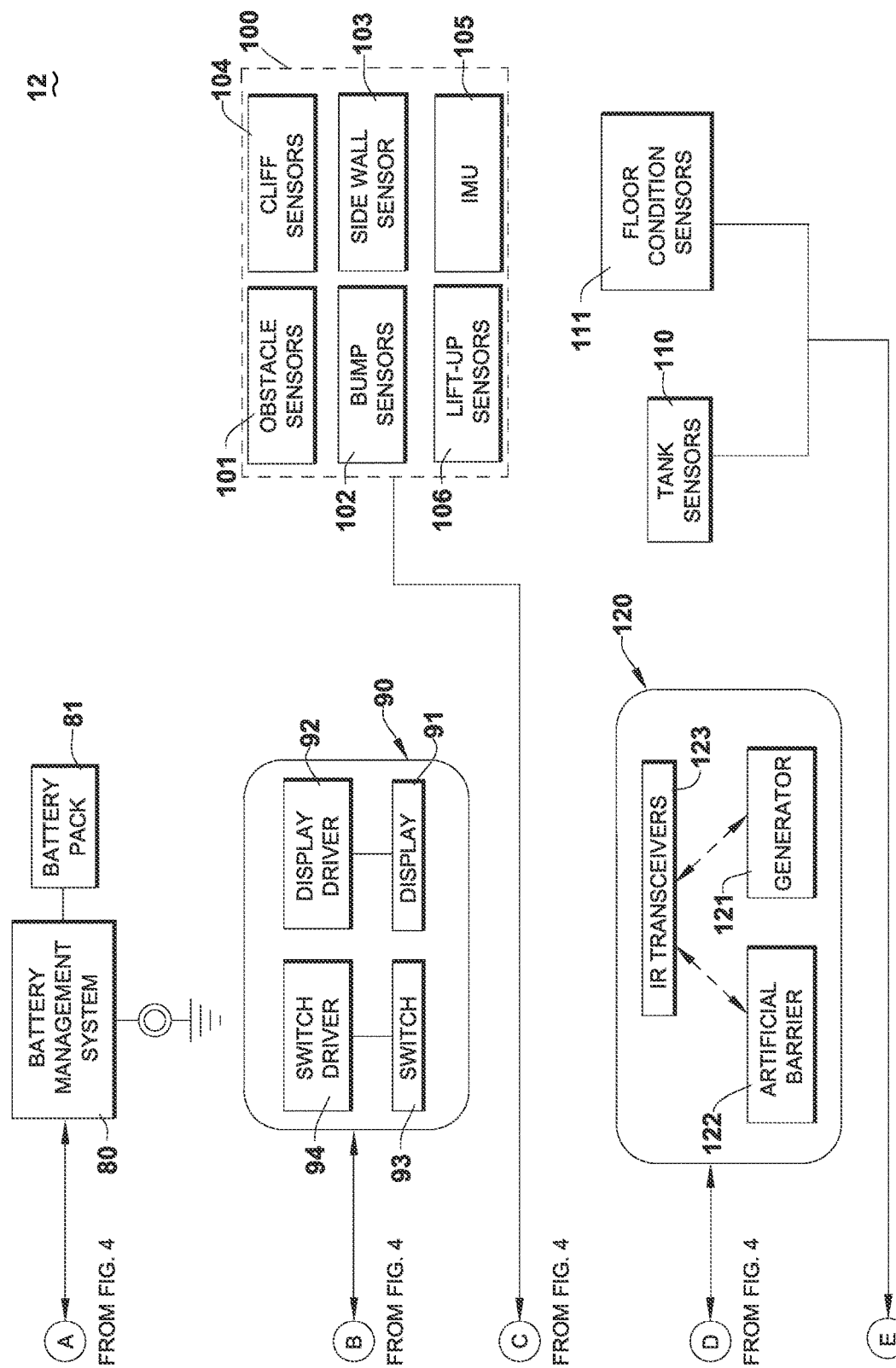
FIG. 5 is a schematic view of the autonomous floor cleaner of FIG. 4 illustrating additional functional systems according to one aspect.

FIGS. 4 and 5 illustrate a schematic view of an autonomous floor cleaner 12 according to one aspect. FIGS. 4 and 5 have many of the same components as FIGS. 2 and 3. Like components are labeled alike, and the description of those components may be found above with reference to FIGS. 2 and 3.

The autonomous floor cleaner 12 can include at least the components of a debris removal assembly 60 for removing liquid and debris from the surface to be cleaned, a fluid delivery system 50 for storing cleaning fluid and delivering the cleaning fluid to the surface to be cleaned, and a drive system 70 for autonomously moving the robot 10 over the surface to be cleaned. The debris removal assembly may alternately be referred to as a vacuum collection or recovery system.

The debris removal assembly 60 can be configured as a sweeping or mechanical collection system that mechanically collects dirt and liquid without the use of suction, such as by the agitators 61 mechanically propelling dirt and liquid directly into the recovery tank 44. In another alternative or additional collection mechanism, a mopping or dusting assembly can be provided for removing moistened dirt and other debris from the surface to be cleaned, and can include at least one stationary or rotatable cleaning pad.

Optionally, the debris removal system 60 may include a vacuuming system 45. The vacuuming system 45 can include a recovery pathway through the housing 16 having an air inlet defined by a suction nozzle (not shown) and an air outlet (not shown), a debris receptacle, bin, or recovery tank 44 for receiving recovered liquid and/or debris for later disposal, and a suction source 46 in fluid communication with the suction nozzle 45 and the recovery tank 44 for generating a working air stream through the recovery pathway. The suction source 46 can include a vacuum motor 47 located fluidly upstream of the air outlet, and can define a portion of the recovery pathway.

The suction nozzle may be positioned in close proximity to the agitator 61 to collect liquid and debris directly from the agitator 61. In another aspect, the suction nozzle can be positioned to confront the surface to be cleaned to remove liquid and debris from the surface, rather than the agitator 61.

The recovery tank 44 can define a portion of the recovery pathway and can comprise a separator (not shown) for separating liquid and debris from the working airstream. Optionally, a pre-motor filter and/or a post-motor filter (not shown) can be provided in the recovery pathway as well. The recovery pathway can further include various conduits, ducts, or tubes for fluid communication between the various components of the vacuuming system 45. The vacuum motor 47 can be positioned downstream of the recovery tank 44 in the recovery pathway. In other aspects, the vacuum motor 47 may be located fluidly upstream of the recovery tank 44.

Figure 6:
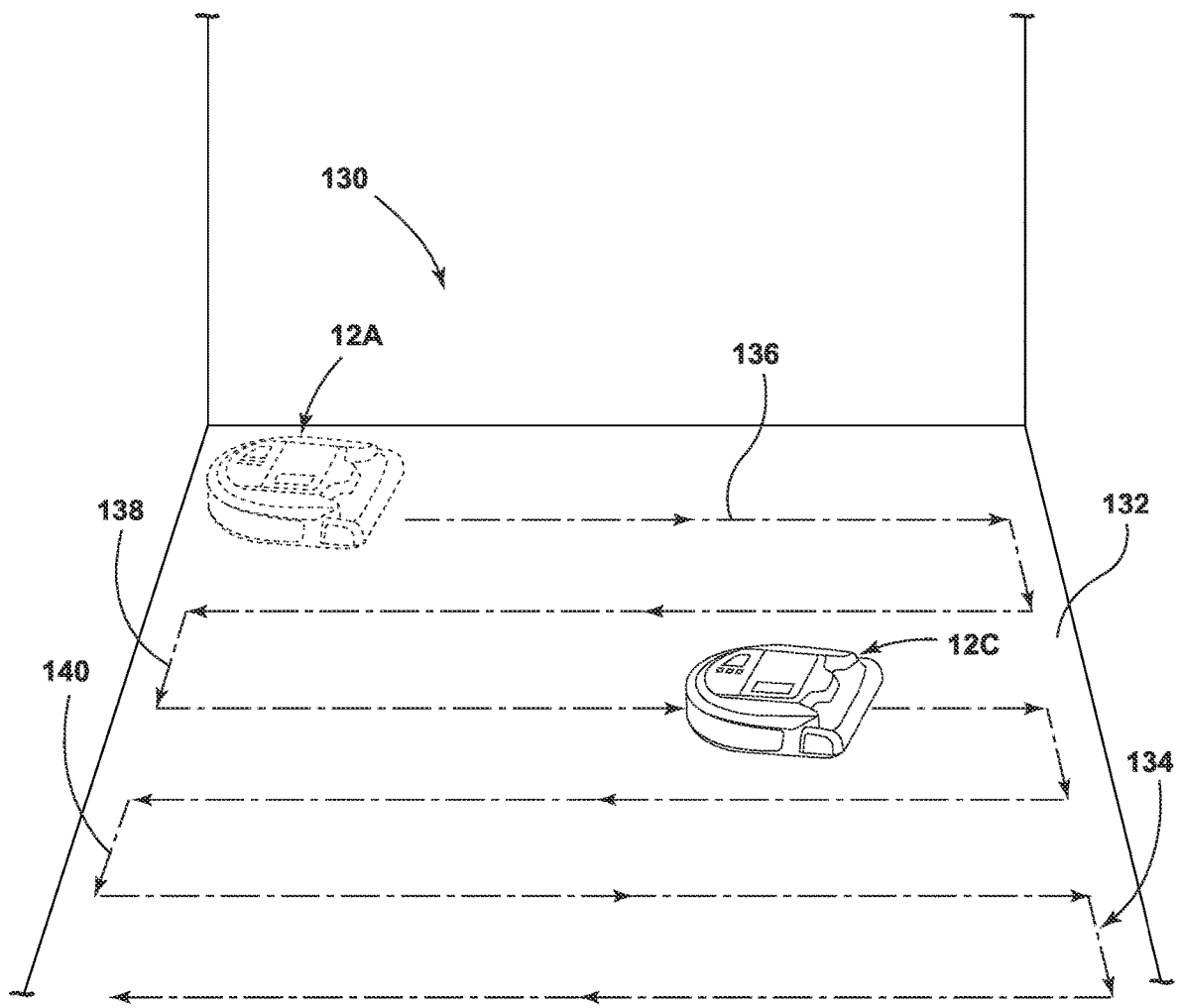
FIG. 6 is a perspective view of a wet clean path of an autonomous floor cleaner according to one aspect.

FIG. 6 is a perspective view of a wet clean path of the autonomous floor cleaner 12 according to one aspect. The autonomous floor cleaner 12 is shown in a starting position 12A and an instantaneous position 12C. The autonomous floor cleaner can be placed in or autonomously move to a cleaning area 130 on a cleaning surface 132. A representation of a wet clean path 134 is shown. When the autonomous floor cleaner 12 is configured in a wet clean mode, the wet clean path 134 may include a clean and dry portion 136, a clean and wet portion 138, and a portion to be cleaned or planned cleaning path 140.

II. Display of Dynamically Changing Wet Clean Path

Figure 7:
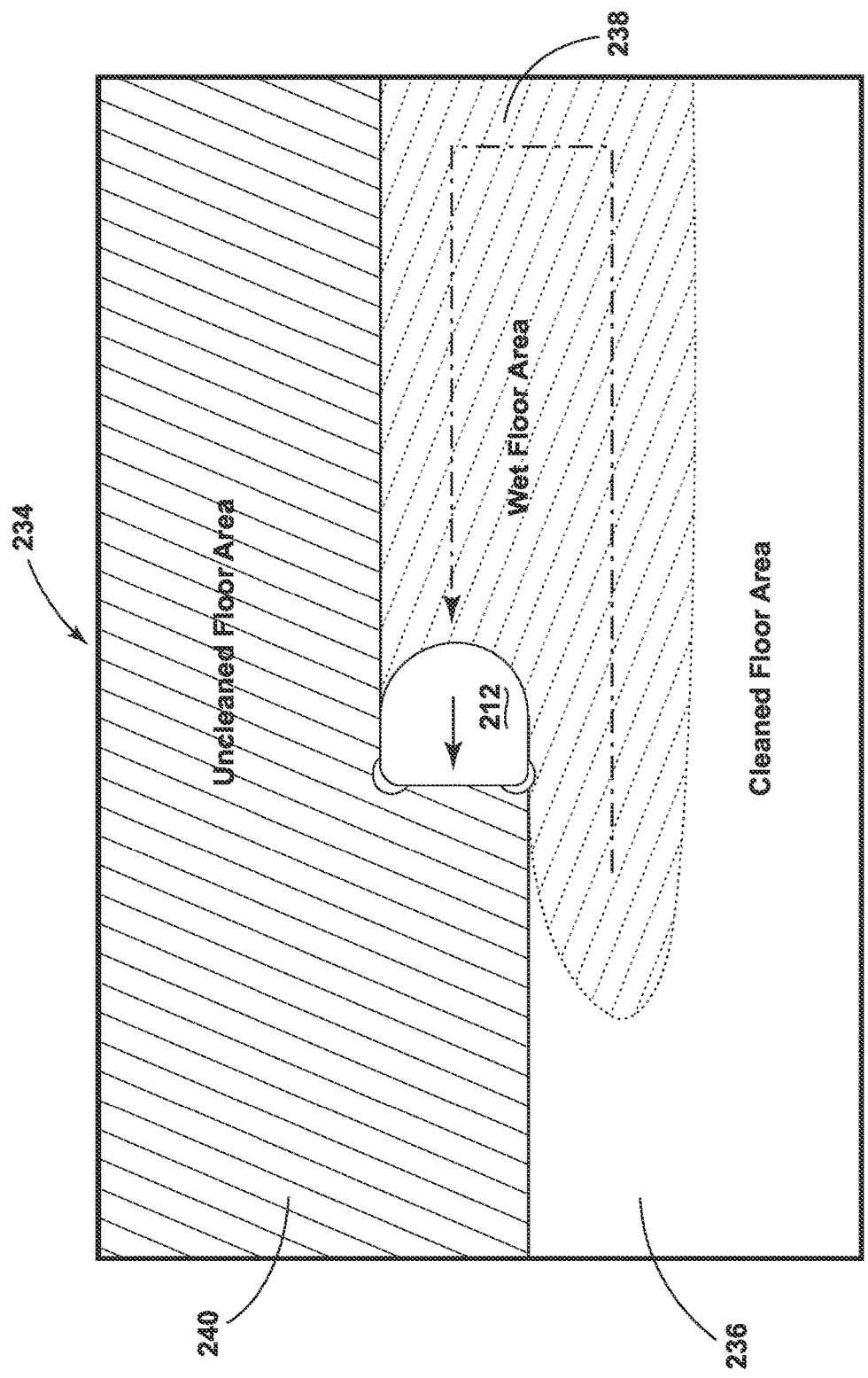
FIG. 7 depicts a wet clean path of an autonomous floor cleaner for display on a mobile device according to one aspect.

FIG. 7 illustrates one exemplary cleaning view of a display screen 24 of a mobile device 14 in communication with an autonomous floor cleaner 12. The depicted view displays an image of a wet cleaning area 234 representative of a wet clean path 134 of an autonomous floor cleaner 12 according to one aspect. In this aspect, the wet cleaning area 234 includes a clean and dry portion 236 of the wet cleaning area representative of the actual clean and dry portion 136 of the wet clean path 134, a clean and wet portion 238 of the wet cleaning area 234 representative of the actual clean and wet portion 138 of the wet clean path 134, and an uncleaned or planned cleaning portion 240 representative of the uncleaned or actual planned cleaning path 140.

Figure 10:
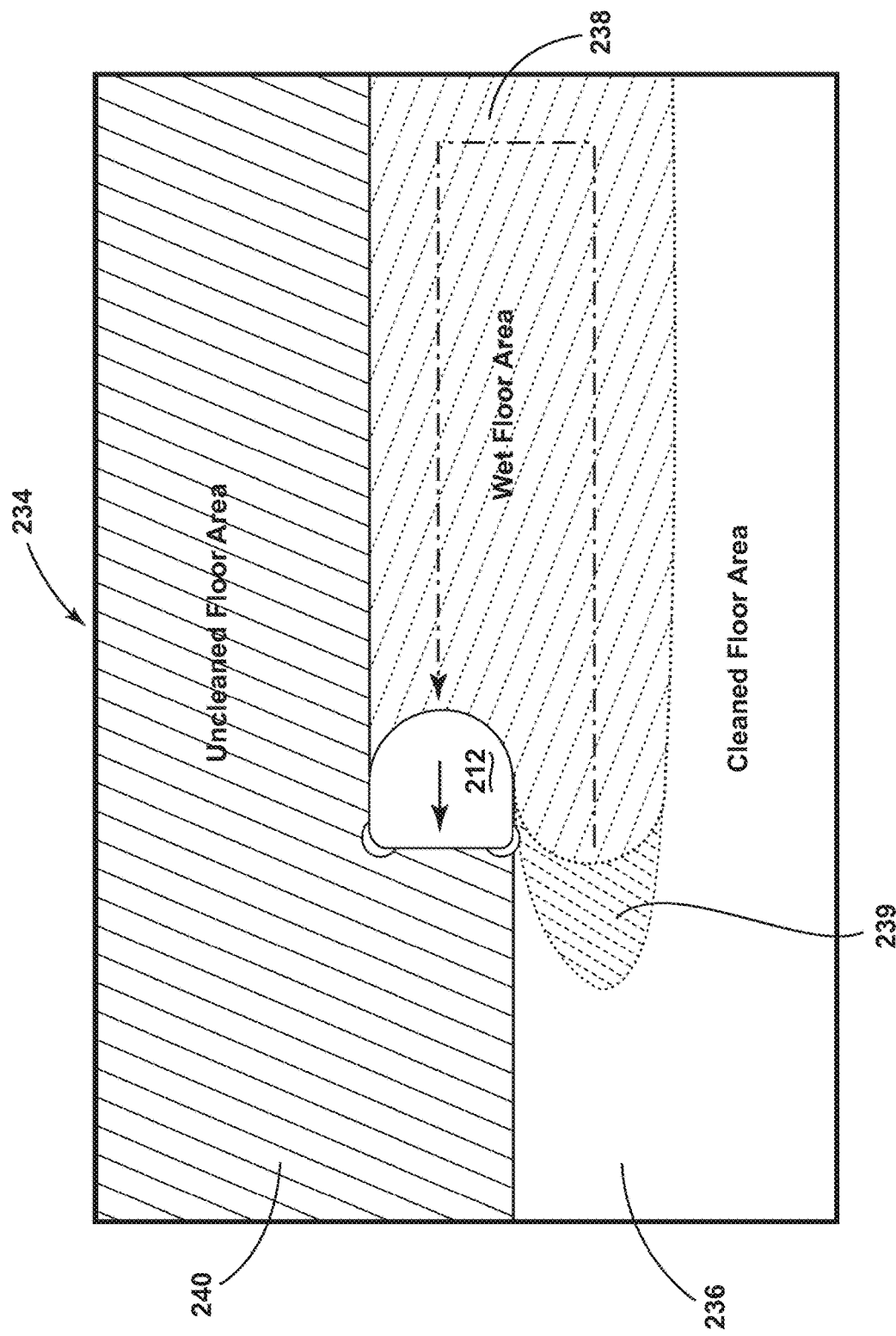
FIG. 10 depicts a spot cleaning path of an autonomous floor cleaner for display on a mobile device.

The display of wet, dry, and uncleaned floor areas can be presented on the display screen 24 of a mobile device 14 in several different ways. For example, the display of one or more wet floor areas 238, one or more cleaned floor areas 236, and one or more uncleaned floor areas 240 on a floor cleaning map can be provided in real-time or as a recording in the floor cleaning robot control application. FIG. 10 illustrates the same cleaning area 234 as depicted in FIG. 7 at a later moment in time. The robot 212 has moved along its path reducing the uncleaned floor area 240 relative to the wet floor area 238, 239 and cleaned floor area 236.

In addition to or instead of the wet clean area 238, another representation of the wet clean path of the autonomous floor cleaner, such as a line representing a traversal path 242 of the autonomous floor cleaner can be displayed on the display screen 24 of the mobile device. This traversal path can indicate the autonomous floor cleaner path and the tail of the path can be dynamically shortened as the portion associated with that portion of the wet cleaned floor dries.

While the display of wet, dry, and uncleaned floor areas and the traversal path 242 are discussed in connection with being displayed on a mobile device, these representations can be displayed in addition to or instead on a display screen or with a projection system of the autonomous floor cleaner itself or of an autonomous floor cleaner dock.

The cleaning area 234 can represent a map or floor plan. The floor plan can be derived based on data provided by a navigation system of the autonomous floor system. For example, a Light Detection and Ranging (LIDAR) system or a Visual Simultaneous Localization and Mapping (VSLAM) system can provide floor plan and other information about the autonomous floor cleaner's environment. Information about the autonomous floor cleaner's wet clean path and dry clean path can be overlaid on the floor plan to assist the user in understanding the cleaning status of the floor relative to the floor plan. For example, the autonomous floor cleaner icon 212, uncleaned floor area, wet floor area, cleaned floor area, and wet clean traversal line can work in conjunction to dynamically display the autonomous floor cleaner's wet clean path and dry clean path, as shown in FIG. 7.

The representation of the cleaning area 234 on the display 24 can depict different estimated floor conditions. For example, the view can display a representation of the cleaning area 234 that depicts which portions of the floor corresponding to the map are wet 238 and should be avoided being walked on. Likewise, the view can display representations of the cleaning area 234 that have yet to be cleaned 240 or have been cleaned recently, but are estimated to be sufficiently dry 236 and therefore can be walked on.

Figure 8:
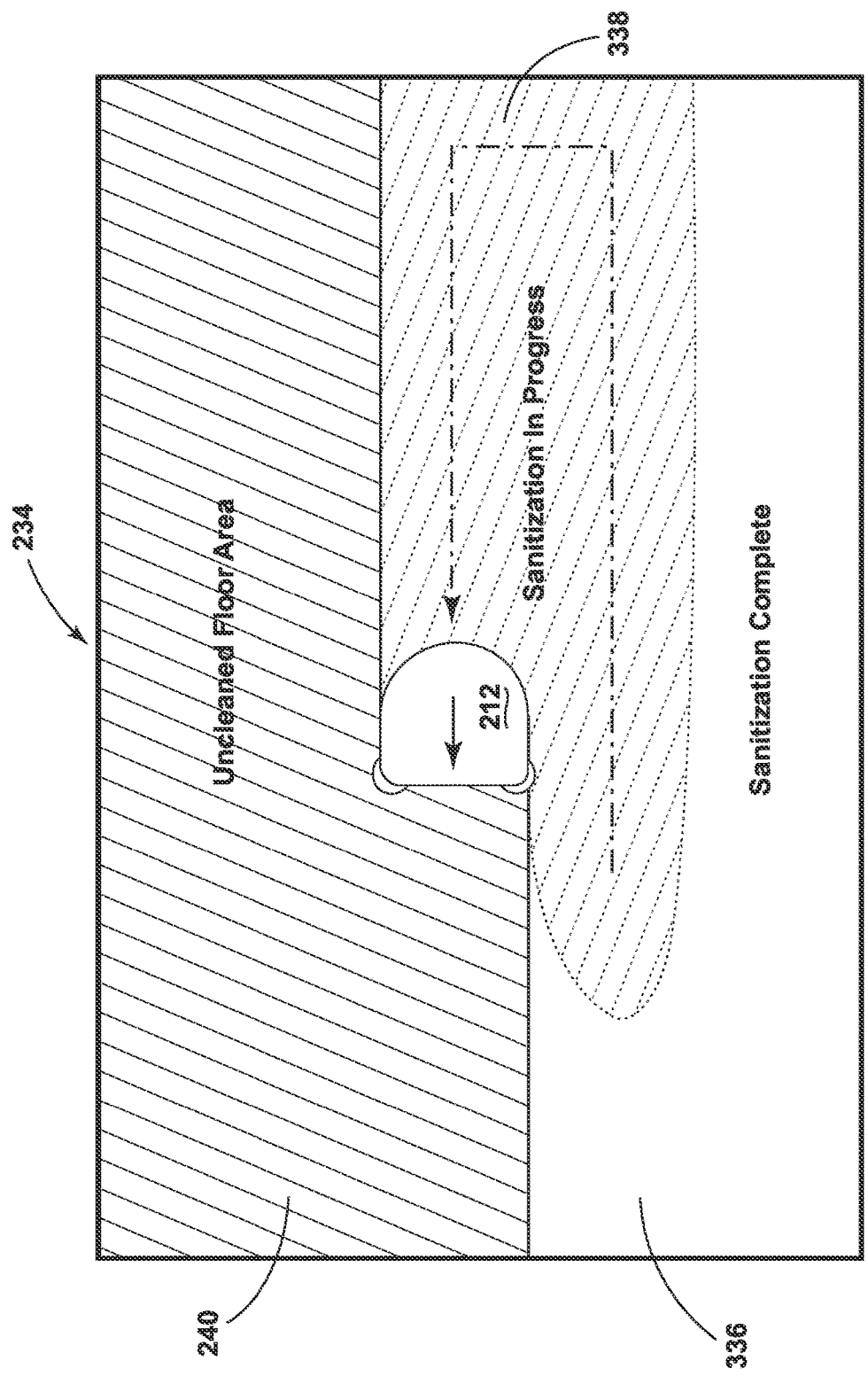
FIG. 8 depicts a sanitation path of an autonomous floor cleaner for display on a mobile device according to another aspect.

In some embodiments, information about the autonomous floor cleaner's sanitization process can be overlaid on the floor plan to assist the user in understanding the sanitization status of the floor relative to the floor plan. That is, in some embodiments, the view can display the cleaning area that is being sanitized and the status of that process. For example, the autonomous floor cleaner icon 212, uncleaned floor area 240, sanitization in progress area 338, sanitization complete floor area 336, and sanitizing traversal line can work in conjunction to dynamically display the autonomous floor cleaner's sanitization path, as shown in FIG. 8. The wet clean path can be represented in multiple ways. For example, a path line representing where the robot has traversed may be included in addition to visual representations showing the sanitization progress of the traversed areas. Although not depicted in FIG. 7 or 8, the visual representation can also include a planned path showing where the autonomous floor cleaner plans to travel over the uncleaned floor area.

There may be some correlation between wet floor area 238 and sanitization in progress areas 338 and between cleaned floor areas 236 and areas where sanitation is complete 336. In some embodiments, both wet/dry floor status and sanitization status may both be overlaid on the floor plan using different indicia to distinguish between the different statuses. The different statuses (e.g., wet/dry/sanitization in progress/sanitized/uncleaned) can be combined using different visual styles, That is the various statuses can be depicted with their own visuals or mixed and matched utilizing various different hatching, coloring, or other visual effects to represent the various different statuses either individually or in combination.

For modes where the autonomous floor cleaner utilizes a sanitization formula, the autonomous floor cleaner may be programmed to traverse areas more than once to ensure sanitization. For example, one exemplary sanitization formula generally takes about five minutes of time with the floor being wet to suitably sanitize. However, it may take only two or three minutes for the floor to dry out after the autonomous floor cleaner drives over a given area. Accordingly, the autonomous floor cleaner can be programmed such that it cycles over the area being sanitized before the area dries out such that the wet sanitizing time is reached (e.g., five minutes).

The representations of the different statuses of the cleaning areas (e.g., clean-wet 238, sanitization in progress 338, sanitization complete 336, clean-dry 236, and uncleaned 240) can be depicted in a variety of different ways. A few exemplary ways in which the representations of different cleaning area statuses can be differentiated include each cleaning area status having a different color, pattern, shading, outline, or other visual marking. The map may also be augmented to include a visual representation of the cleaning path. This can include the planned cleaning path and completed cleaning path. Further, if the autonomous floor cleaner travels an area multiple times, this can be depicted as part of the cleaning path. Some autonomous floor cleaners include a dry clean mode and a wet clean mode. The robot position information or robot telemetry information communicated to the mobile device can include a status identifier that informs the device whether the autonomous floor cleaner is configured in wet clean mode or dry clean mode. The communication can also include other information about the flow rate and speed of the autonomous floor cleaner, among other types of information.

For example, in one aspect, the base mapped floor area can be depicted with a first visual marking style and the area behind where the robot has traveled can be depicted with a second, different, visual marking style to indicate where the floor has been cleaned. In addition, a third visual marking style can show the areas of the floor that are still wet from cleaning, but which can transition to the second visual marking style once the wet cleaned floor is estimated to be dry and clean. The uncleaned floor area may or may not include a distinction between the base map and a planned cleaning area. For example, in some aspects, the uncleaned floor area may be left blank, shown with an outline, or without a visual marking style.

The transition time can be determined in a variety of different ways. In one aspect, the dry time is estimated with a timer calibrated to the flow rate mode in which the robot is set (e.g., "low," "med," or "max" flow rate mode). That is, the length of time in which a patch of wet cleaned floor takes to dry can be generally estimated based on how much liquid is dispensed by the autonomous floor cleaner, which is based on the selected flow rate mode. This time-based prediction can be performed without the use of moisture or wetness sensors that directly detect floor wetness. One exemplary autonomous floor cleaning robot has three flow rate modes: low, medium, and maximum. In the low flow rate mode, the autonomous floor cleaning robot dispenses about 3 mL per minute, which corresponds for one exemplary autonomous floor cleaner to an estimated 3 minute dry time. In the medium flow rate mode, the autonomous floor cleaning robot dispenses about 5 mL per minute, which corresponds to an estimated 4 minute dry time. In the maximum flow rate mode, the autonomous floor cleaning robot dispenses about 7 mL per minute, which corresponds to an estimated 5 minute dry time. Other autonomous floor cleaning robots with different wet clean systems can be calibrated to different dry times. In alternative aspects, the autonomous floor cleaning robot can have additional floor rate modes and corresponding estimated dry times.

Transition time from wet to dry clean floor can be estimated in other ways. For example, one or more motor encoders and/or other robot telemetry may be utilized to monitor the location and timing of the autonomous floor cleaner relative to the cleaning area 234. The motor encoder values can be utilized to estimate the time liquid was dispensed at a particular location and in conjunction with the flow rate information associated with the autonomous cleaner, the drying times can be visually represented on a map view of the cleaning area, as depicted in FIG. 7 and FIG. 10.

Shaded regions 238, 239 of the wet floor area of FIG. 10 illustrate how the wet floor status on the map of the cleaning region can be represented by a plurality of pixels. In some embodiments, the controller can determine a pixel value for each of the plurality of pixels based upon a comparison of drying time, elapsed time, and the autonomous floor cleaner position information. In some embodiments, the controller can be configured to change the plurality of pixels representing the wet floor status on the map of the cleaning region at different rates according to the relative distance to a cleaning solution outlet of the autonomous floor cleaner. In certain embodiments, a first wet floor status on the map of the cleaning region is represented by a first plurality of pixels of the region indicating a first wet clean status, and a second wet floor status on the map of the cleaning region is represented by a second plurality of pixels of the region indicating a second wet clean status.

In another aspect, dry time can be estimated based on robot speed. Some autonomous floor cleaners maintain a generally consistent speed throughout a cleaning run, but that speed may vary from cleaner to cleaner and/or from run to run. The drying times can account for the speed of the autonomous floor cleaner in addition to the flow rate of the cleaning liquid being dispensed. Further, some floor cleaning robots can move at a variable speed throughout a run and the drying time may be calibrated to a moving average speed, actual current speed, or another speed metric.

Some autonomous floor cleaners may have a spot clean mode or another mode that causes the floor cleaner to apply variable amounts of liquid to a particular floor area. Spot clean mode generally refers to a mode in which the autonomous floor cleaner repeatedly drives over and cleans a relatively small area (e.g., a 1 m$^2$ area). A spot clean sanitization mode refers to a specific type of spot cleaning mode where the autonomous floor cleaner applies sanitization formula to the floor while repeatedly driving over the small area.

An autonomous floor cleaner in spot clean mode generally traverses the spot clean area such that it does not allow any portion of the area to dry out. That is, the autonomous floor cleaner is generally configured to repeatedly traverse the spot clean area over and over until the entire area has been cleaned. For spot clean sanitization modes, i.e., spot cleaning that utilizes sanitization formula, the autonomous floor cleaner can be configured to repeatedly traverse the area repeatedly to keep it wet with sanitization formula for a prescribed sanitization time associated with the sanitization formula (e.g., about five minutes for one exemplary sanitization formula).

Figure 9:
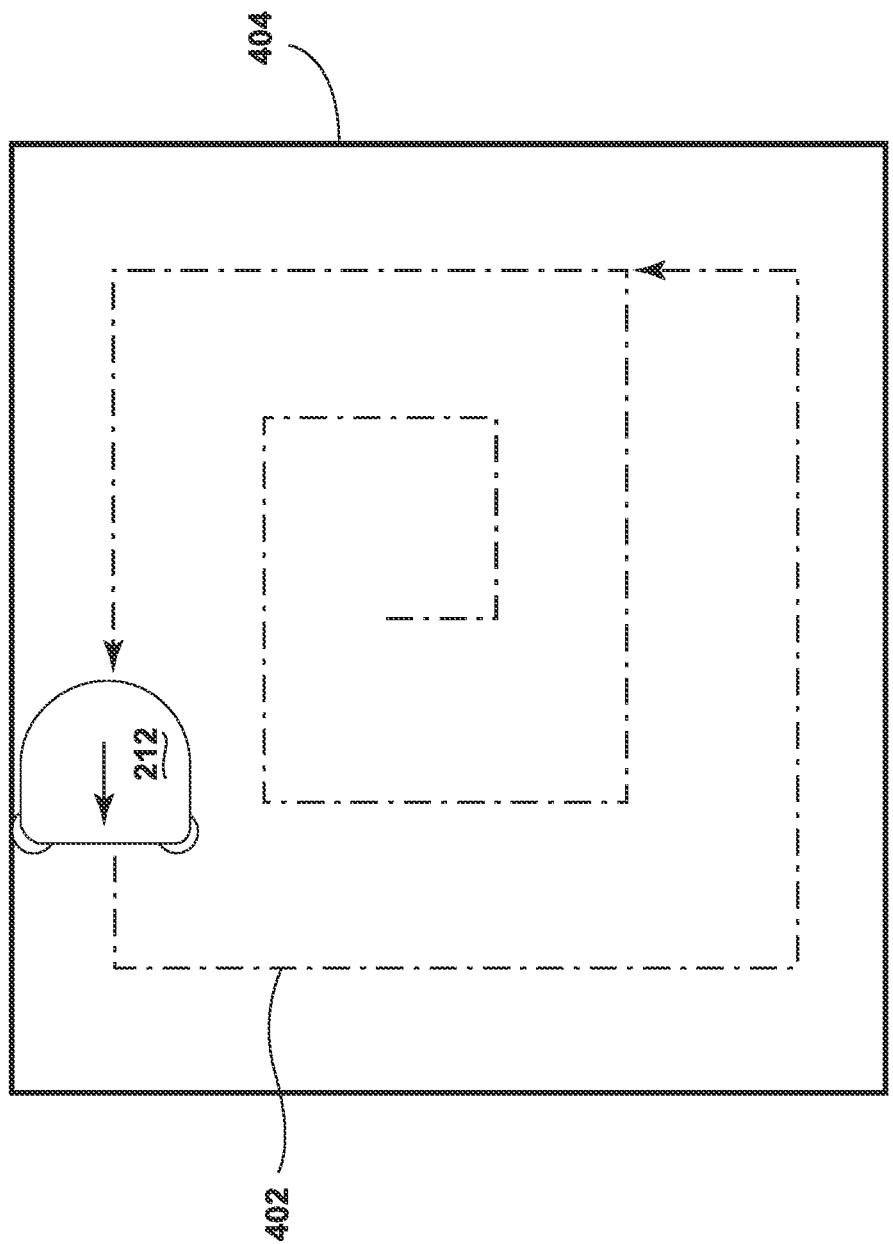
FIG. 9 depicts a spot cleaning path of an autonomous floor cleaner for display on a mobile device according to another aspect.

An exemplary autonomous floor cleaner spot clean path for display on a mobile device or other electronic device that represents an actual autonomous floor cleaner spot clean path is illustrated in FIG. 9. The autonomous floor cleaner icon 212 is animated showing it traversing a visual representation of the spot clean area 404 along a spot cleaning path 402. The virtual representation represents a real time (or recorded) traversal of an actual autonomous floor cleaner traversing an area of a floor being spot cleaned. In the depicted embodiment, the spot cleaning path 402 is a spiral path with the autonomous floor cleaner starting in the middle of the spot clean area and spiraling outwards towards the borders of the spot clean area 404. The autonomous floor cleaner can drive to the center of the spiral and repeat the spiral path until the spot cleaning is complete (e.g., until the entire spot clean area has been wet with sanitization formula for at least five minutes in a spot clean sanitization mode). The autonomous floor cleaner can follow a variety of other spot clean paths (or combinations of paths). For example, the autonomous floor cleaner can spiral inwards toward a center point and then spiral outwards, or vice versa. Put simply, the autonomous floor cleaner can traverse a path during sanitizing spot clean mode that includes repeated traversal of a spot clean area such that the entire spot clean area reaches a continuous threshold wetness (with sanitizing formula) for at least a sanitizing completion time, such as five minutes.

In the depicted embodiment, the spot clean path 402 shows the entire path of the autonomous floor cleaner including both where the autonomous floor cleaner has previously traversed and where the autonomous floor cleaner plans to travel in the future. In alternative embodiments, the previously traversed pathing can be represented with a different visual style than the planned traversal path—with spot mode, because generally the path is repeated, the entire path may be represented with a single visual style. While a single path line may be shown to represent the traversal path of the autonomous floor cleaner, the visual representation may include additional indicia to represent that cleaning or sanitization progress of the area being spot cleaned, as discussed in more detail below.

In spot cleaning mode scenarios, a visual representation of a perimeter around a wet area may be utilized to show the area being spot cleaned and the associated dry time may be based on the accumulated flow rate of liquid to that area. For example, the drying time can be adjusted based on the flow rate, speed of the autonomous cleaner, and the number of passes over a particular area. In some aspects, the spot clean mode causes the drying time to be refreshed each time the autonomous floor cleaner traverses the area or a specific portion of the area. The autonomous floor cleaner or device in communication with the autonomous floor cleaner can be configured to accumulate or add a new amount of wetness to a tracked current level of wetness. The drying time can be adjusted accordingly. In some aspects, spot clean areas may not track the specific level of wetness but instead may indicate a pre-determined dry time based on one or more factors. For example, in spot clean mode, the autonomous floor cleaner may be configured to clean a small (e.g., about 1.5 sq. meters) area a few times in a row, and to keep the area wet for at least a minimum amount of time (e.g., about 5 minutes). Under these conditions, the spot will generally stay wet for 10 to 15 minutes, and this timing can be coordinated and reflected with the timer in the application that is displayed to the user.

Another example of how the representations of the different statuses of the cleaning areas can be depicted is discussed in the context of the spot sanitization mode. In one aspect, the view can display an area being sanitized, which can also be referred to as a sanitize target zone 404, e.g., with a border defined by the user or defined by the autonomous floor cleaner. The view can display the robot icon 212 driving around the sanitize target zone 404, and as the spot clean time (e.g., 5 minutes) elapses, the area can change the visual representation (e.g., color, pattern), from an initial visual representation (e.g., brown or hatching with higher line/dot density), to a second visual representation (e.g., green or hatching with less line/dot density) to indicate status of the sanitization process, such as time until sanitization is complete. When the spot clean time is complete, the area can be represented entirely with the second visual representation style (e.g., green or hatching with low line/dot density), or alternatively the area can snap to a third visual representation (e.g., third color, or different style of hatching), to indicate successful sanitization (e.g., purple or different direction hatching). A few exemplary ways of visually representing the sanitization process during the spot sanitization mode are discussed below in more detail.

In one embodiment, the path that the robot travels during spot mode can be displayed in a different color or pattern to represent the status of the sanitization. For example, a gradient can indicate that the floor is getting 'less wet' as more time elapses since the robot drove over it. However, each time the autonomous floor cleaner traverses the same area (e.g., in the case of a spiral, or other overlapping pattern), the color/pattern (or other representation) of that area can be reset to the representation of the 'most wet' representation. Then, at the end of the sanitization time (e.g., 5 minutes) or at the end of the spot cleaning cycle, the visual representation can change to a different representation (e.g., color or pattern), indicating the area has been sanitized.

In another embodiment, the path of the robot during sanitizing spot mode can be a fixed visual representation style (e.g., color or pattern), and then at the end of the cleaning time or the end of the spot-clean cycle, the fixed visual representation style can change to a different style (e.g., a different color or pattern), indicating the area has been sanitized.

In yet another embodiment, the visual representation of the autonomous floor cleaner path 402 (e.g., color or pattern) displayed behind the robot could start out as a particular visual representation style (e.g., certain color/pattern) to indicate wetness, and then as time elapses, the visual representation can change to be closer and closer to a visual representation representing sanitized so that after the sanitization time has elapsed the visual representation of the floor has transitioned entirely to the visual representation representing that the floor has been sanitized.

The views (live or recorded) of the cleaning area 234 can depict not only the different floor cleaning statuses, but the transition over time between the different floor cleaning statuses. For example, when a typical cleaning run begins, the entire floor may be depicted as an uncleaned floor area 240. As the robot traverses the floor, the uncleaned floor area 240 transitions to wet cleaned floor 238. Then, as time passes the wet clean floor area 238 can transition to dry cleaned floor area 236 based upon suitable estimated dry times. For example, the estimated dry times can depend on the flow rate mode of the autonomous floor cleaner at the time in which the floor was cleaned. The flow rate mode is generally static for a particular cleaning run, but in some aspects, the flow rate mode or another factor may alter the estimated dry timings, which can be accounted for in the transition graphics of the cleaning area 234.

The transitions between the different floor cleaning statuses can be depicted in a variety of different ways. In one aspect, the visual marking style of one floor cleaning status immediately changes to the visual marking style of another floor cleaning status. In another aspect, a transition visual marking style may be presented as the floor cleaning status changes from one visual marking style to another. For example, as the wet floor area 238 transitions to a dry cleaned floor area 236, the visual marking style can transition from the visual representation of the wet floor area 238 to the visual representation of the dry clean floor area 236.

Where the wet clean areas are depicted in one color and the dry clean areas are depicted in another color, the transition between the two statuses can be depicted by changing the color of the pixels representing the path the robot has recently traveled over. The speed of change can be proportional to the estimated dry time (e.g., based upon the flow rate mode in which the robot is set). In some aspects, the transition from wet cleaned area to dry cleaned area may be graduated and there can be multiple levels of wetness depicted on the cleaning area 234. For example, the amount of shading or hue of color of the wet clean area may have multiple levels depending on the amount of drying time that has surpassed. The different amounts of drying can be discrete zones that are indicative of the degree of dryness, such as a first zone where a dryness level of 0-10% dry has a first pattern, 11-20% has a second pattern, and so on.

The transitioning from wet to dry may not be uniform. In some aspects, this non-uniformity can be ignored while in other aspects the non-uniformity can be reflected in the graphical depiction of the transitioning between different floor cleaning statuses. The location of the liquid dispensed at a particular location relative to the wet clean pads or other wet cleaning attachments on the autonomous floor cleaner can impact the drying time. For example, as shown at the tail end of the wet clean floor area 238, the edge area away from the pads may dry quicker than the area closer to where the liquid is dispensed. The drying pattern can be determined experimentally and applied to the visual representation. The transitioning can also be impacted by multiple traversals of the autonomous floor cleaner.

The depiction of the cleaning area 234 can be presented as an animation or snapshots that are updated periodically or upon refresh by the user. For an animation representation, the "live" view can provide a real-time depiction of the floor status, with an icon 212 representing the autonomous floor cleaner 12 as it moves about the room. As the autonomous floor cleaner 12 moves, the corresponding floor cleaning area statuses can be updated in real-time or near real-time. The animation need not be presented live. In some aspects, the animation may be presented in a delayed fashion. For example, the animation may be presented as a complete animation once the cleaning session is complete and the autonomous floor cleaner 12 is docked. The animation may have controls associated that allow the user to watch the robot path as it wet cleans the cleaning area and how the floor status changes over time. The animation may also continue to evolve even after cleaning has been completed to depict the transition from the wet clean floor to dry clean floor that occurs even after the autonomous floor cleaner has completed its run. The mobile user application on the device 14 can be configured to provide a notification to the user at different moments in time. For example, when the cleaning run is complete the user may be presented with a depiction of the current map showing the areas of the floor that are still wet. For example, when the entire floor is estimated to be dry clean a notification may be provided to the user. Further, additional notifications may be provided to the user based upon the transition to certain dry clean status. For example, the autonomous floor cleaner may be configured to wet clean a path across a floor to provide an efficiently provide a dry clean path across a floor. A notification of such a path being dry cleaned may be provided to the user based upon the estimated dry times.

For a snapshot representation, the icon 212 representing the autonomous floor cleaner 12 can be depicted at an instantaneous moment in time along with the corresponding floor statuses. As the autonomous floor cleaner 12 moves, it can communicate with the user's mobile device (e.g., directly or via a cloud server system) to provide updates. The update can provide sufficient information for the mobile device 14 application to display an updated position of the autonomous floor cleaner icon 212 and changes in the statuses of the floor cleaning area 234. These snapshots can be updated periodically over time. For example, once every second, every five seconds, once a minute, or at another period (e.g., user selectable). Alternatively or in addition, the snapshot may be updated or refreshed at the request of the user. For example, the user may activate a user interface feature (e.g., tapping the screen) to update the visual representation of the cleaning area 234 according to the most recent data available, or it may initiate a request for the autonomous floor cleaner 12 to communicate information to the mobile application in order to update the icon 212 position and the statuses of the cleaning area 234.

By depicting the floor status based upon the estimated dry time, the different floor cleaning statuses depicted on the cleaning area 234 provides the user with a sense of what is going on with their floor, in an up-to-the moment, live view, and is a reminder the robot is performing wet cleaning.

While one aspect estimates the transition times from wet clean to dry cleaned areas based upon the flow rate mode of the autonomous floor cleaner (i.e., the flow rate), the estimated dry transition times can be based upon different or additional factors. For example, the estimated dry times can be adjusted or set based upon the particular wet cleaning solution and/or floor type being cleaned.

Directional terms, such as "vertical," "horizontal," "top," "bottom," "upper," "lower," "inner," "inwardly," "outer" and "outwardly," are used to assist in describing the invention based on the orientation of the aspects shown in the illustrations. The use of directional terms should not be interpreted to limit the invention to any specific orientation(s).

The above description is that of current aspects of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all aspects of the invention or to limit the scope of the claims to the specific elements illustrated or described in connection with these aspects. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed aspects include a plurality of features that are described in concert and that might cooperatively provide a collection of benefits. The present invention is not limited to only those aspects that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular.

The aspects of the invention in which an exclusive property or privilege is claimed are defined as follows:

1. A mobile device associated with an autonomous floor cleaner, the autonomous floor cleaner configurable in a wet clean mode, the mobile device comprising:
    a display screen;
    a memory configured to store a representation of a wet clean path of the autonomous floor cleaner;
    a communication module configured to receive position information indicative of the wet clean path of the autonomous floor cleaner;
    a control system configured to display, on the display screen, a wet clean path of the autonomous floor cleaner, wherein the representation of the wet clean path dynamically changes over time based upon expected drying time of the wet clean path; and
    wherein the wet clean path is dynamically represented by a plurality of pixels, and wherein the control system determines a pixel value for each of the plurality of pixels based upon a comparison of drying time, elapsed time, and the position information.

2. The mobile device of claim 1,
    wherein the memory is configured to store a map of a cleaning region, and
    wherein the control system is configured to display, on the display screen, the map of the cleaning region and the wet clean path of the autonomous floor cleaner relative to the map of the cleaning region.

3. The mobile device of claim 1, wherein the wet clean path includes indicia indicative of a dynamic amount of wetness along the wet clean path.

4. The mobile device of claim 1, wherein the wet clean path dynamically changes over time from a first indicia to a second indicia based upon expected drying time of the wet clean path.

5. The mobile device of claim 1, wherein the expected drying time of the wet clean path is based on at least one or more of a flow rate of the autonomous floor cleaner, a floor type of a cleaning area, a solution type of a cleaning solution output by the autonomous floor cleaner, and a cleaning agitator orientation of the autonomous floor cleaner.

6. A mobile device associated with an autonomous floor cleaner, the autonomous floor cleaner configurable in a wet clean mode, the mobile device comprising:
    a communication module configured to receive wet clean flow rate information and autonomous floor cleaner position information;
    a memory configured to store wet clean flow rate information, a map of a cleaning region, and autonomous floor cleaner position information;
    a display screen configured to display the map of the cleaning region and a wet floor status on the map of the cleaning region associated with at least a portion of the cleaning region traversed by the autonomous floor cleaner;
    a controller configured to determine and display, on the display screen, the wet floor status based on the wet clean flow rate information and the autonomous floor cleaner position information; and
    wherein the wet floor status on the map of the cleaning region is represented by a plurality of pixels, and wherein the controller determines a pixel value for each of the plurality of pixels based upon a comparison of drying time, elapsed time, and the autonomous floor cleaner position information.

7. The mobile device of claim 6 wherein the controller is configured to determine the wet floor status based on a comparison of estimated drying time associated with the wet clean flow rate information and an elapsed time since the autonomous floor cleaner traversed the associated portion of a cleaning path of the cleaning region.

8. The mobile device of claim 7 wherein the controller is configured to set the wet floor status on the map of the cleaning region to wet clean in response to the elapsed time since the associated portion of the cleaning region traversed by the autonomous floor cleaner being less than the estimated drying time.

9. The mobile device of claim 7 wherein the controller is configured to set the wet floor status on the map of the cleaning region to dry clean in response to the elapsed time since the associated portion of the cleaning region traversed by the autonomous floor cleaner being greater than or equal to the estimated drying time.

10. The mobile device of claim 7 wherein the controller is configured to display the wet floor status on the map of the cleaning region varying over time based on the difference between the elapsed time and the estimated drying time.

11. The mobile device of claim 7, wherein the controller is configured to estimate drying time based on at least one or more of a flow rate of the autonomous floor cleaner, a floor type of the cleaning region, a solution type of a cleaning solution output by the autonomous floor cleaner, and a cleaning agitator configuration of the autonomous floor cleaner.

12. The mobile device of claim 6, wherein the controller determines dynamic changes to the plurality of pixels representing wetness of the traversed portion of the cleaning region over time based on at least one or more of a flow rate of the autonomous floor cleaner, a floor type of the cleaning region, a solution type of a cleaning solution output by the autonomous floor cleaner, and a cleaning agitator configuration of the autonomous floor cleaner.

13. The mobile device of claim 6, wherein the controller is configured to change the plurality of pixels representing the wet floor status on the map of the cleaning region at different rates according to relative distance to a cleaning solution outlet of the autonomous floor cleaner.

14. The mobile device of claim 6, including a region representing an area traversed by the autonomous floor cleaner, wherein a first wet floor status on the map of the cleaning region is represented by a first plurality of pixels of the region representing a first wet clean status and a second wet floor status on the map of the cleaning regions is represented by a second plurality of pixels of the region representing a second wet clean status.

15. A method of displaying a cleaning routine of an autonomous floor cleaner using a mobile device, the autonomous floor cleaner configurable in a wet clean mode, the method comprising:
storing, in memory, a representation of a wet clean path of the autonomous floor cleaner;
receiving, from the autonomous floor cleaner, position information indicative of the wet clean path of the autonomous floor cleaner;
displaying, on a display screen, a representation of a wet clean path of the autonomous floor cleaner that dynamically changes over time based upon expected drying time of the wet clean path, wherein the wet clean path is dynamically represented by a plurality of pixels; and
determining a pixel value for each of the plurality of pixels based upon a comparison of expected drying time, elapsed time, and the position information.

16. The method of claim 15 including storing a map of a cleaning region and displaying, on the display screen, the map of the cleaning region and the representation of the wet clean path of the autonomous floor cleaner relative to the map of the cleaning region.

17. The method of claim 15 wherein the representation of the wet clean path includes indicia indicative of a dynamic amount of wetness along the wet clean path.

18. The mobile device of claim 15, wherein the representation of the wet clean path dynamically changes over time from a first indicia to a second indicia based upon expected drying time of the wet clean path.

19. The mobile device of claim 15 including calculating the expected drying time of the wet clean path based on at least one or more of a flow rate of the autonomous floor cleaner, a floor type of a cleaning area, a solution type of a cleaning solution output by the autonomous floor cleaner, and a cleaning agitator orientation of the autonomous floor cleaner.

* * * * *